United States Patent [19]
Williams et al.

[11] Patent Number: 5,641,437
[45] Date of Patent: Jun. 24, 1997

[54] MARKING OF MOLD INSERTS TO PRODUCE MARKED CONTACT LENSES

[75] Inventors: Wayner E. Williams, Orange Park; Mark A. Duarte, Jacksonville, both of Fla.

[73] Assignee: Johnson & Johnson Vision Products, Inc., Jacksonville, Fla.

[21] Appl. No.: 536,159

[22] Filed: Sep. 29, 1995

[51] Int. Cl.$^6$ ................................................. B29D 11/00
[52] U.S. Cl. ........................... 264/2.5; 264/1.36; 264/485; 264/227
[58] Field of Search ...................... 264/2.5, 1.36, 264/1.37, 1.38, 485, 488, 219, 227

[56] References Cited

U.S. PATENT DOCUMENTS

| | | | |
|---|---|---|---|
| 3,829,536 | 8/1974 | Alvarez | 264/227 |
| 4,194,814 | 3/1980 | Fischer et al. | |
| 4,525,044 | 6/1985 | Bauman | |
| 5,147,585 | 9/1992 | Blum | 264/1.38 |
| 5,219,497 | 6/1993 | Blum | 264/1.7 |
| 5,467,149 | 11/1995 | Morrison et al. | |

*Primary Examiner*—Mathieu D. Vargot

[57] ABSTRACT

A method for producing visible marks in molded contact lenses, particularly soft hydrogel contact lenses, by placing a recessed mark configuration in a metal insert. The metal insert is subsequently used to produce injection molding frames, which are then subsequently used in the molding of the final contact lenses. The recessed mark configuration is at least approximately 10 microns deep, has a Volume Index, which is the ratio of the quantity volume below a reference surface minus the volume above the reference surface over the volume below the reference surface, of at least approximately 0.9. The recessed mark configuration also preferably has a ratio of surface roughness (RMS or Ra) to a peak-to-valley (PV) measurement, RMS/PV or of Ra/PV, of greater than approximately 0.15. The recessed mark configuration in the metal insert is subsequently transferred as a raised portion to the injection molded frames, and is then subsequently transferred as a visible recessed mark in contact lenses molded in the frames prepared using the inserts. The ratio of the surface roughness (RMS or Ra) to the height (H), wherein H is the distance between two reference lines in a profile of the mark, RMS/H or Ra/H, is at least approximately 1.5. A preferred method of imparting the recessed configuration to the insert is by Electric Discharge Machining (EDM). The dimensions of the several parameters can be verified by using a noncontact scanning white light interferometer.

12 Claims, 6 Drawing Sheets

MARKING OF MOLD INSERTS TO PRODUCE MARKED CONTACT LENSES

BACKGROUND OF THE INVENTION

1. Field of the Invention

The present invention relates generally to the marking of mold inserts to produce marked contact lenses, and more particularly pertains to electric discharge machining of mold inserts for contact lenses. The present invention is efficient, controllable, repeatable, and provides a readily visible mark in the final lens product without adding significantly to the expense of manufacture thereof.

The present invention relates to a method of imparting visible marks to stabilized soft molded (SSM) hydrogel contact lenses. Such visible marks are used as inversion indicators, which are visible marks of a special design placed on the lens to allow the user to determine if the lens is in the proper configuration or to determine if it has been inverted so as to be inside out. Other visible marks can be employed as trademarks to identify the manufacturer. Visible marks are also required in those types of contact lenses which require orientation with respect to the eye for insertion. Visible marks are also desirable to allow a user to more easily see and locate the lens when it is in a solution, such as a saline solution used in the original packaging of the contact lens or in a storage container.

2. Discussion of the Prior Art

The prior art discloses many technical approaches for solving the problem of imparting visible marks to contact lenses. Laser etching or burning is taught by EP 291459 and JP 61223820. Diamond point engraving is disclosed in DE 3316730. Printing techniques, some of which use photosensitive materials which are subjected to UV energy, are shown in GB 200614, DE 3219890 and JP 61211382, among others. Other coloring or dying techniques are disclosed in JP 62186221, JP 62186222, JP 62250286, among others.

All of these prior art approaches are slow and difficult to control, and typically add expense to the manufacturing of the contact lenses.

SUMMARY OF THE INVENTION

In view of these deficiencies in the prior art, it would be beneficial to develop a method for marking soft contact lenses which is efficient, controllable, repeatable in a mass production environment, does not add significant expense to the manufacturing of the lens product, and which provides a readily visible mark in the final contact lens product.

Accordingly, it is a primary object of the present invention to provide for marking of mold inserts used to produce marked contact lenses.

In accordance with the teachings herein, the present invention provides a method of producing visible marks in molded contact lenses. The method comprises placing a recessed mark configuration in a metal insert, which is subsequently used to produce injection molded frames, which are then subsequently used in the molding of the final contact lenses. The recessed mark configuration is at least approximately 10 microns deep, and has a Volume Index (VI), which is the ratio of the quantity volume below a reference surface minus the volume above the reference surface over the volume below the reference surface, of at least approximately 0.9. The recessed mark configuration in the metal insert is subsequently transferred as a raised portion to the injection molded frames, and is then subsequently transferred as a visible recessed mark in contact lenses molded in the frames prepared using the inserts.

In greater detail, the recessed mark configuration has a ratio of surface roughness (Ra), wherein Ra is the arithmetic average deviation from the center line or best fit surface, to a peak-to-valley (PV) measurement, Ra/PV, of greater than approximately 0.15, and has a ratio of surface roughness RMS, wherein RMS is the root-mean-square deviation from the center line or best fit surface, to a peak-to-valley (PV) measurement, RMS/PV, of greater than approximately 0.15. The method of the present invention is particularly applicable to stabilized soft molded (SSM) hydrogel contact lenses.

Moreover, the ratio of the surface roughness (RMS or Ra) to the height (H), wherein H is the distance between two reference lines in a profile of the mark, RMS/H or Ra/H, is at least approximately 1.5.

A preferred method of imparting the recessed configuration to the insert is by Electric Discharge Machining (EDM).

The dimensions of the above several parameters RMS, Ra, PV and VI can be verified by using a noncontact scanning white light interferometer.

In contrast to the prior art, the method of the present invention is efficient, controllable, repeatable, and provides a readily visible mark in the final lens product without adding significantly to the expense of manufacture thereof.

BRIEF DESCRIPTION OF THE DRAWINGS

The foregoing objects and advantages of the present invention for marking of mold inserts used to produce marked contact lenses may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
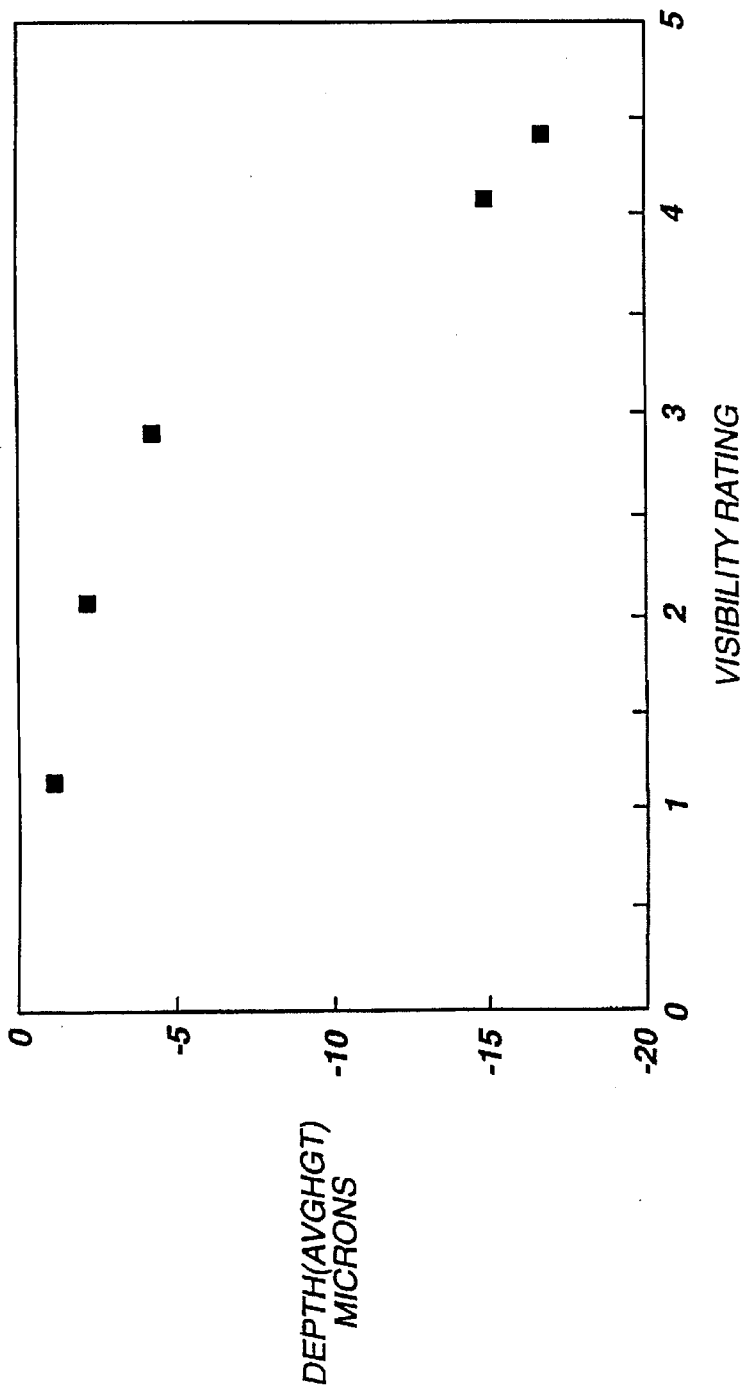
FIG. 1 illustrates a graph of mark depth versus visibility rating, and shows graphically that a mark must be deeper than 10 microns in order to be effectively visible.

The overall molding process employed by the present invention is well known in the prior art, and employs metal insert molds, each of which is used to produce many thermoplastic injection molded frames, each of which is subsequently used only once to mold a single contact lens. In this process, the thermoplastic frames are injection molded in the metal insert molds to produce two halves which are jointed in the course of the process to form a mold cavity. The mold cavity formed by the injection molded frames is then filled with monomer which is polymerized to form a lens, which is removed from the mold and further processed to yield the final product soft hydrogel lens. The frames may be manufactured from any thermoplastic material which is capable of being injection molded and which provides the final cast lens with the required optical properties, with preferred materials for frames being polystyrene and polypropylene. To injection mold the frames, metal tool inserts of the required configuration are machined and mounted in an injection molding machine as is well known in the prior art. The injection molded frames are exact inverse reproductions of the metal mold inserts.

In the present invention, recessed visibility mark configurations are machined into the face of the metal inserts. In the subsequent injection molding process, the thermoplastic polymer material conforms to the shape and dimensions of the metal insert, hence the injection molded frames have a raised portion on their surface which exactly conforms to the recessed configuration in the metal mold inserts. In the subsequent casting operation for the contact lenses, the reactive polymer dosed into the mold cavity exactly conforms to the mold surface, hence, after polymerization the lens has a recessed configuration which exactly conforms to the raised portion on the mold, and exactly replicates the recessed portion that was placed in the metal mold insert.

The recessed configuration on the metal mold insert may be formed by any of several processes well known in the prior art such as laser etching, chemical etching, machining, electric discharge machining, etc., provided the required depth, surface roughness and volume index, all of which will be described hereinafter, are achieved. A preferred method of imparting a recessed configuration of proper parameters is through electric discharge machining (EDM).

Electric discharge machining (EDM) is well known in the prior art, and is described in the book *A PRACTICAL GUIDE TO ELECTRODE MATERIAL SELECTION*, by Poco Graphite, 1601 S. State, Decatur, Tex. 76234, particularly at pages 8–16 thereof.

One designed embodiment of the present invention used an M25J EDM unit as supplied by Mitsubishi International Corp. of Wood Dale, Ill. 60191. In burning the mark, the electrode fires to the side walls as well as downwardly. This forms a roughness on both the sides and bottom of the mark. The current, rate of travel, electrode size, and number of passes influence the final surface roughness. Roughness, as noted hereinafter, is required to render visibility to the mark.

Verification and determination of the achieved mark parameters can be accomplished by using a NewView 100 interferometer and MetroPro Software, both of which are supplied by ZYGO Corp. of Middle Field, Conn. The NewView 100 uses noncontact scanning white light interferometers to build high resolution x, y and z axis images for characterization of surface topography. The NewView 100 splits light from its own light source, transmitting one beam to a precise internal surface and the other to the sample surface. The reflected beams recombine inside the interferometer. The resulting optical path differences cause the beams to generate constructive and destructive interference, thereby producing the light and dark fringe pattern visible on the video monitor.

The selection of the appropriate EDM process (burn) condition is critical to the overall visibility and performance of the mark. A particular burn condition consists of the values of several variables. The values and the appropriate combination of these variables which will produce an acceptable burn have been predetermined by the manufacturer, and have been programmed into supplied software. These variable combinations are known as "E" packages (E-packs) and are designated by the letter "E" and a 4-digit number. Table 1 contains examples of some of the values of the burn conditions used, along with the E-pack designator, with the variables listed in the left column being defined in detail in the users manual available from the manufacturer. The variables listed in the left column have the following brief descriptions.

EP-SEL selects the type of power supply:
  TP: Standard Transistor power supply,
  SF: Fine Finish Circuit,
  SC: Slope Control Circuit, or
  GM: Fine Finish Circuit for glossy mirror surfaces.
POL is the Polarity Select: Selections are positive (+) and negative (−):
  Positive polarity means spark is going from electrode to part,
  Negative polarity means spark is going from part to electrode.
AUX is the Auxiliary Setting Select: Auxiliary settings are used for power settings on SF, SC Circuits settings 0 to 9.
Ip is the Peak Current Settings: For setting actual peak current amperage setting 0 to 10.
DEL Ip is the Fine adjust of peak current amperage setting 0 to 10.
GAP(F) is the Gap Voltage: The Gap setting has two purposes. First it selects the type of Servo response, either EP or MV. Second the Gap selects the gap voltage (voltage potential present while the gap is open and machining is on). Settings EP 0–5/MV 10–15.
ON is the On time select: Selects the discharge pulse ON time. Settings 1 to 12.
DEL ON is a fine adjust of on time. Settings 0 to 9.
OFF is an off time select: The discharge pulse off time. Settings 1 to 12.
DEL OFF is a fine adjust of off time. Settings 0 to 9.
JUMPU is Jump Up which selects the actual distance betwen part and electrode. Settings 0 to 9.

JUMPD is Jump Down which selects the actual jump down times. Settings 1 to 9.

PCON is Parallel Condensers: The PCON setting selects the number of parallel condensers (capacitors) that can be added to the discharge circuit. Settings 0 to 5.

JUMP is a Jump On/Off Select: The range is from 0 to 9, 0 (off) 1 to 9 (on).

GAIN is a Gain Select: Controls the Servo Gain in units of 1 (smallest) to 99 (largest).

OPAJ is an Optimizer Sensitivity Select: The range of the optimizer sensitivity is 0 (the most sensitive) to 10 (the least sensitive).

Each variable of the E-pack can be independently changed in order to effect changes in the quality of the burn. The two main variables which afford the largest changes in mark performance (visual perceptibility) are the amperage, Ip and DEL Ip variables. The theory is that the greater the amperage, the stronger and more deeper the burn, which results in a deeper, more well defined mark, thus translating to greater visibility and increased mark discernability.

Another independent variable which effects the mark visibility is the electrode diameter. Appropriate electrode diameters can range from 0.005 to 0.010 inches. In some tests, it was found that larger diameter electrodes diminished the size of the upper triangle in the letter "A", resulting in less visible letters. Electrode diameter is best determined based upon the configuration of the mark applied to the lens.

Each letter is interpolated onto the part by the EDM machine. The distance and the pattern which is made from the start of a character to the end of the character is considered one pass. It is theorized that the more passes made on a character, the deeper the burn, and thus the more visible the character.

Table 2 gives examples of the number of passes made for specific characters; along with the total elapsed time, E-pack designator, and programmed letter height. Limitations on the number of passes depend upon yield performance, processing considerations, and lens geometry in reference to mark placement. It should also be noted that a deeper mark may exhibit a longer wear life on the insert surface over time with consecutive frame molding operations.

Metal inserts were marked under the burn conditions identified in Tables 1 and 2. Lenses were molded from thermoplastic frames produced from metal inserts marked under the burn conditions specified in Table 1 and labeled A, B and C. As indicated by Table 2, Lens A was molded from mold frames produced by metal inserts burned by E-pack E9521 with the designated number of passes. Lens B was molded from mold frames produced by metal inserts burned by E-pack E9520 with the designated number of passes. Lens C was molded from mold frames produced by metal inserts burned by E-pack E9521 with the designated number of passes.

A mark rating team then rated each of the marks on a scale of 1 to 5, with 1 being barely visible and 5 being very visible. The marks using burn condition B, condition #4, and burn condition C, condition #1, were rated best, suggesting that increased burn amperage significantly affects the mark quality. The data reported in the surface characteristic section with visibility ratings of 2.8, 4.1 and 4.4 directly corresponds to the shaded or starred burn conditions of Table 2.

The following are the key characteristics which a mark must have in order to be effectively visible.

Mark Depth - A visible mark must be deeper than 10 microns in order to be visible. FIG. 1 illustrates a graph of mark depth versus visibility rating, and shows graphically that a mark must be deeper than 10 microns in order to be effectively visible. As shown by the mark depth graph, FIG. 1, marks ranging between 0 and 5 microns were rated not very visible in a subjective rating scale. The maximum depth is determined by the process and the final lens geometry.

Volume Index - The volume index is defined as the ratio of the quantity volume below the reference surface minus the volume above the reference surface over the volume below the reference surface, shown mathematically as, $$\text{VOL INDEX} = \frac{\text{VOLdn} - \text{VOLup}}{\text{VOLdn}}$$

Figure 2:
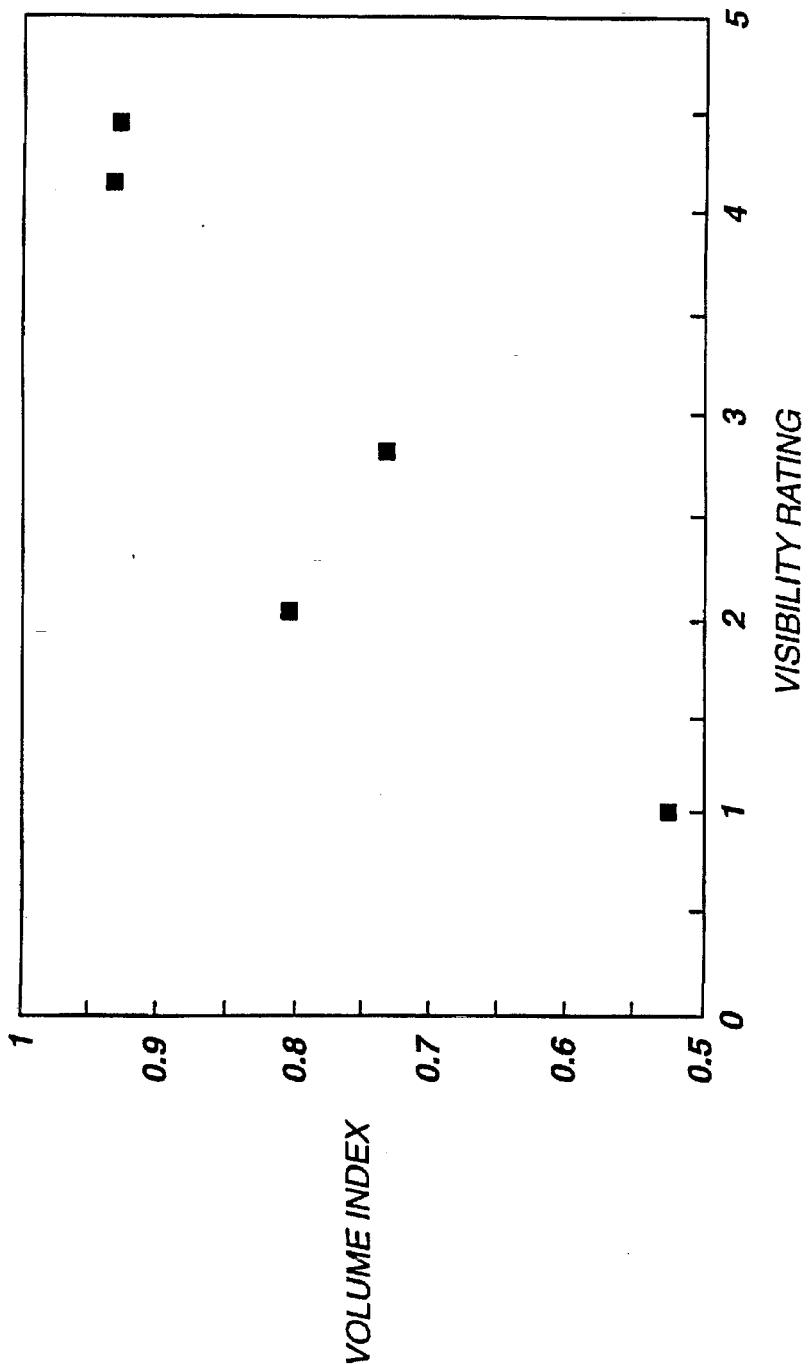
FIG. 2 illustrates a graph of volume index versus visibility rating, and shows graphically that as the volume index approaches 1, the effective visibility of the mark increases, and that the volume index must be a minimum of 0.9 in order for the mark to be effectively visible.

FIG. 2 illustrates a graph of volume index versus visibility rating, and shows graphically that as the volume index approaches 1, the effective visibility of the mark increases, and that the volume index must be a minimum of 0.9 in order for the mark to be effectively visible.

Figure 3:
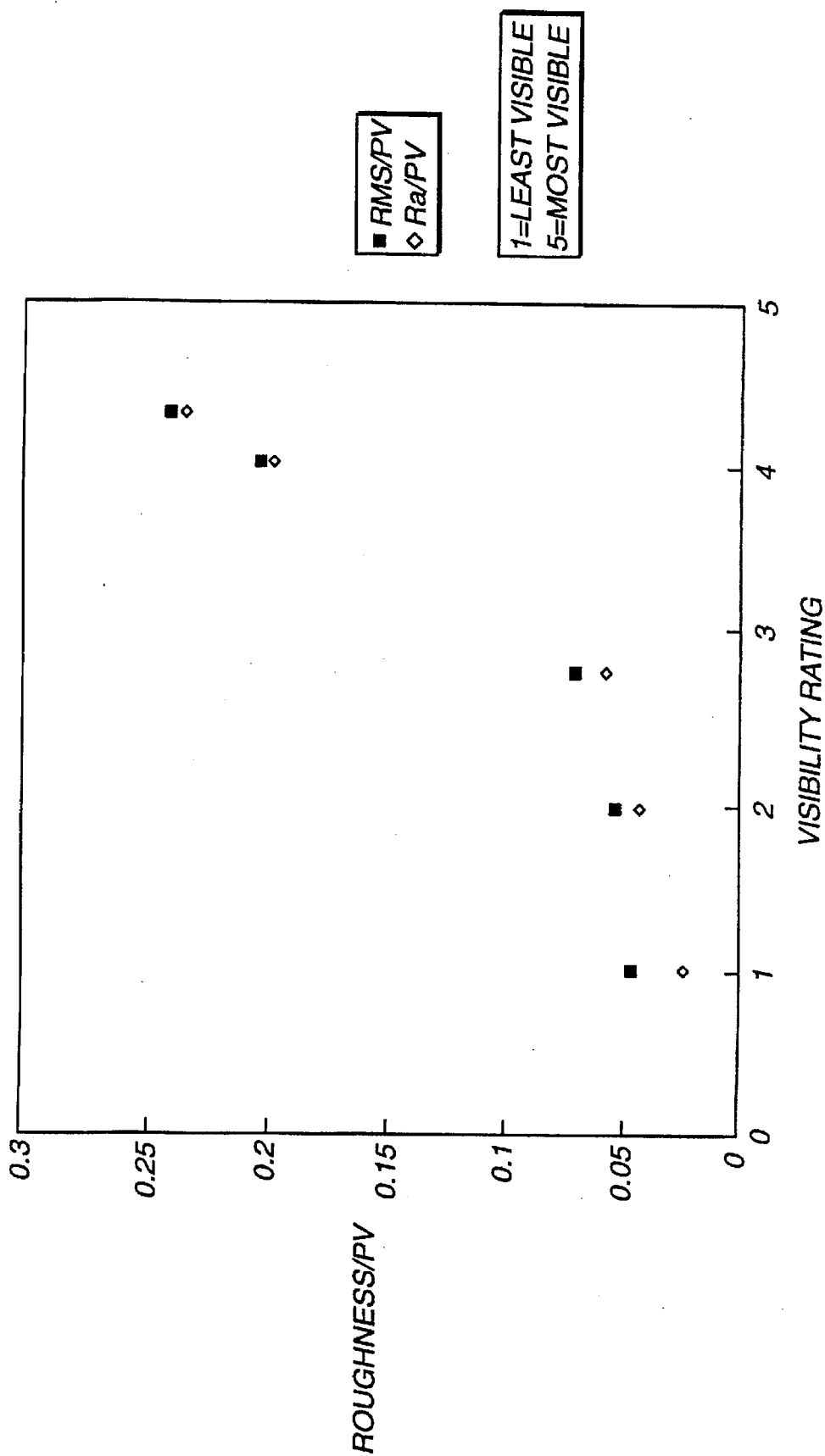
FIG. 3 illustrates a graph of the ratio of surface roughness measurement (RMS and Ra) over the peak-to-valley distance (PV) versus visibility rating, and shows graphically that this ratio must be greater than 0.15 in order for the mark to be effectively visible.

Surface Roughness - Surface roughness can be described by RMS, Ra, PV and H, which are somewhat related as described below. PV is defined as the distance between the highest and lowest points within the sample or mark. H is the distance between two reference lines inside the profile. The upper reference line is positioned at a depth which exposes 5% of the data, and the lower reference line is positioned at a depth which exposes 90% of the data. The net result is that H is less sensitive to data spikes than PV. When the ratios of the surface roughness measurements (RMS and Ra) over PV are plotted, it can be seen that the ratio must be greater than 0.15 in order for the mark to be effectively visible. This is shown by the graph of surface roughness, FIG. 3.

Figure 4:
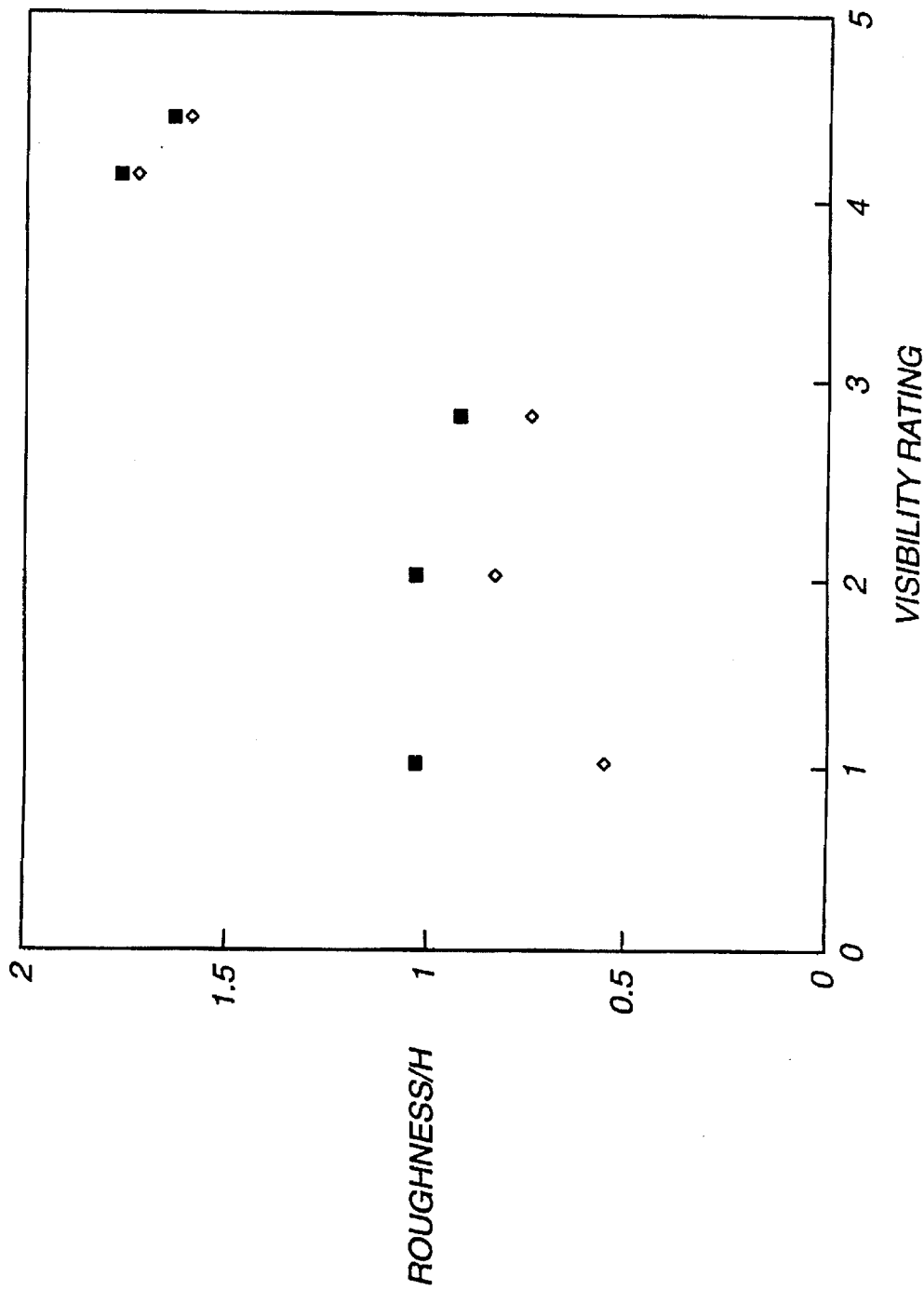
FIG. 4 illustrates a graph of the ratio of surface roughness measurement (RMS and Ra) over H, which is the difference between two reference lines inside the mark profile, versus visibility rating, and shows graphically that this ratio must be greater than 1.5 in order for the mark to be effectively visible.

Similarly, when the ratios are plotted of the surface roughness measurements (RMS and Ra) over the Swedish Height (H) versus visibility rating, it can be seen that this ratio must be greater than 1.5 in order for the mark to be effectively visible. This is shown by the graph of surface roughness in FIG. 4. The maximums are fixed by the process of applying the mark to the metal insert mold.

Figure 5:
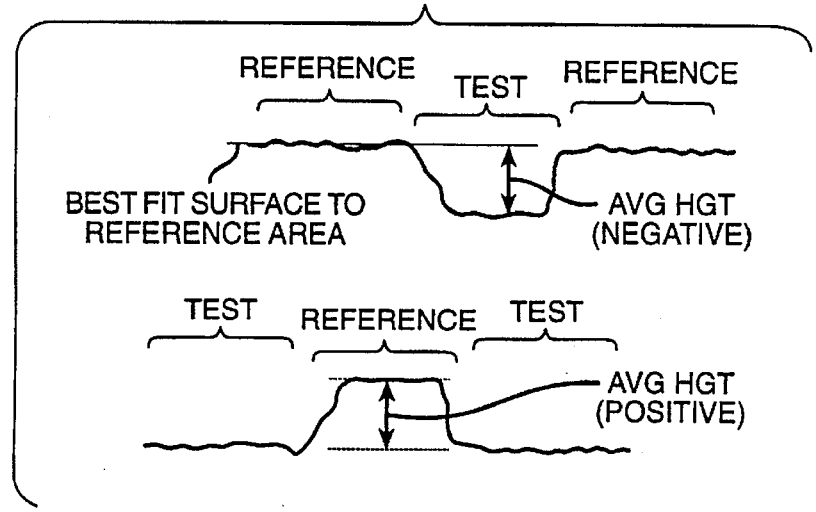
FIG. 5 illustrates graphically the Average Height (AvgHgt), which is the average height of a test data area in the mark profile in relation to a reference data area (which compares an area defined by a test data area to an area defined by a reference mask or data area), and measures the vertical offset therebetween.

FIG. 5 illustrates graphically the Average Height (AvgHgt), which is defined as the average height of a test data area in relation to a reference data area in the instrument's z-axis. It compares an area defined by a test mask to an area defined by a reference mask and determines the vertical offset between them. Height refers to direction along the instrument's z-axis, also known as Avg Ht. If masks are not used in the analysis process, AvgHgt equals the arithmetic average of the data set.

Figure 6:
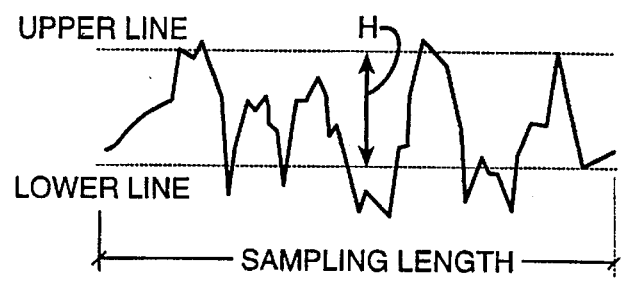
FIG. 6 illustrates graphically the Swedish Height (H), which is the distance between upper and lower reference lines inside the profile in the mark, in which the upper reference line is positioned at a depth which exposes 5% of the data and the lower reference line is positioned at a depth which exposes 90% of the data.

FIG. 6 illustrates graphically the Swedish Height (H), which is defined as the distance between two reference lines inside the profile. The upper reference line is positioned at a depth which exposes 5% of the data and the lower reference line is positioned at a depth which exposes 90% of the data. Swedish height is less sensitive to data spikes than PV.

Figure 7:
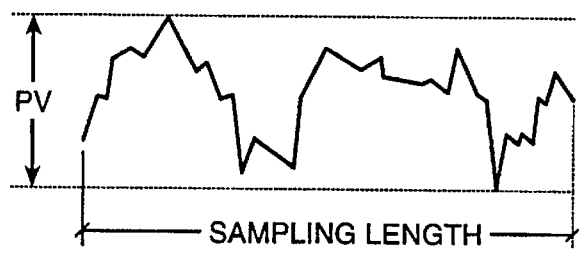
FIG. 7 illustrates graphically the Peak-to-Valley (PV), which is the distance between the highest and lowest points within the sample test area in the mark (or the maximum roughness height), and is used to quantify roughness.

FIG. 7 illustrates graphically the Peak-to-Valley (PV), which is defined as the distance between the highest and lowest points within the sample in the test area. Also known as $R_t$, $R_y$ and $R_{max}$. When used to quantify roughness, PV is the maximum roughness height. PV is the worst case point-to-point error in the data set. PV compares the two most extreme points on the surface; thus, it is possible for two very different surfaces to have the same PV. PV (All) is the distance between the highest and lowest points in both test and reference areas.

Figure 8:
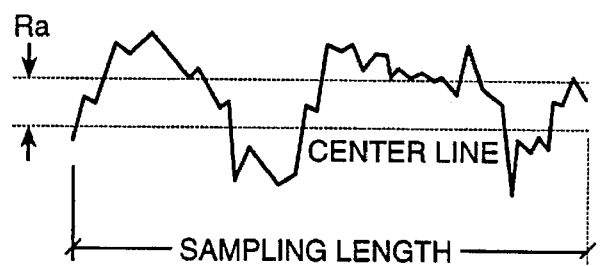
FIG. 8 illustrates graphically Ra, which is defined as the arithmetic average deviation from the center line of the best fit curve or surface.

FIG. 8 illustrates graphically Ra, which is defined as the arithmetic average deviation from the center line or best fit surface $$Ra = \frac{y_1 + y_2 + y_3 \ldots + y_N}{N}$$

where $y_N$ is the absolute value of each data point and N is the number of data points.

Figure 9:
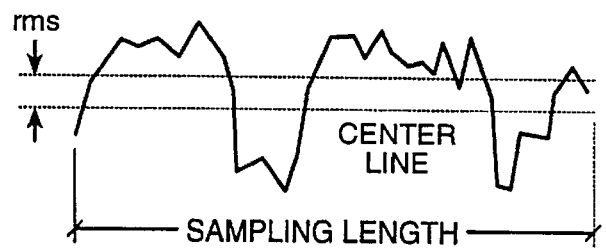
FIG. 9 illustrates graphically the root-mean-square (RMS), which is the root-mean-square deviation from the center line of the best fit curve or surface, and represents an approach to calculating an average by squaring each value and then taking the square root of the mean.

FIG. 9 illustrates graphically the Root-Mean-Square (RMS), which is the root-mean-square deviation from the center line or best fit surface, and calculates an average by squaring each value and then taking the square root of the mean. Also known as Rq, rms is an area weighted statistic; it more accurately depicts the optical performance of the surface being measured than PV because it uses more data in the calculation.

$$RMS = \left[ \frac{y_1^2 + y_2^2 + y_3^2 \ldots + y_N^2}{N} \right]^{1/2}$$

wherein y is the value of each data point, and N is the number of data points in the sample.

Figure 10:
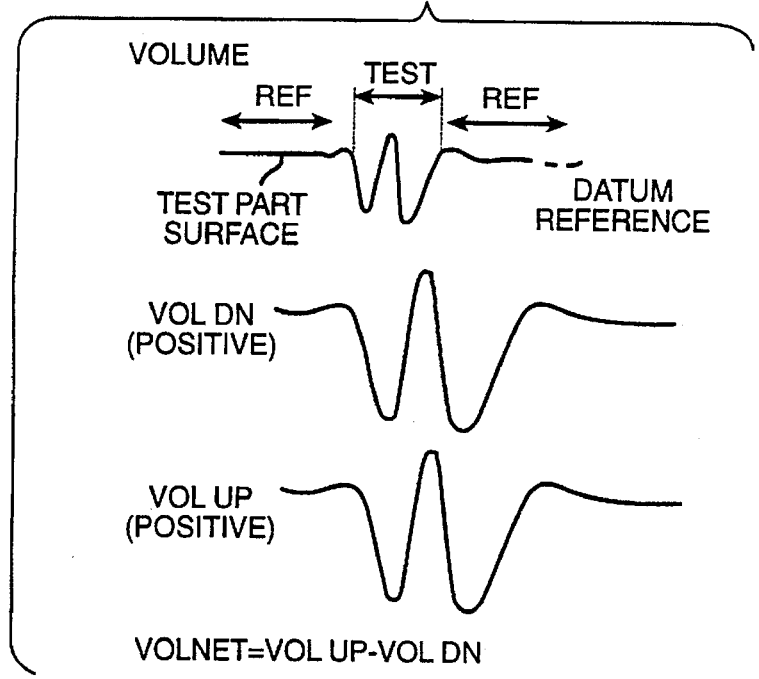
FIG. 10 illustrates graphically the volume, which is the amount of space occupied by the data in the three-dimensional test area defined by the test mask, wherein the volume is calculated by multiplying the height of each data point or pixel by the area of each pixel.

FIG. 10 illustrates graphically the volume, which is defined as the amount of space occupied by the data in the three-dimensional test area defined by the test mask. Volume is calculated by multiplying the height of each data point by the area of the pixel.

Volume Down (Vol Dn) is defined as the volume of the test area which is lower than the reference area. Positive Vol Dn can be thought of as the space occupied by pits on the test area; a negative Vol Dn result would protrude above the reference area.

Volume Up (Vol Up) is defined as the volume of the test area which is higher than the reference area. Positive Vol Up can be though of as the space occupied by bumps on the test area; a negative Vol Up result would extend below the reference area.

Volume Net (Vol Net) is defined as the overall volume of the test area. It is equal to the Vol Up minus the Vol Dn.

While several embodiments and variations of the present invention for marking of mold inserts to produce marked contact lenses are described in detail herein, it should be apparent that the disclosure and teachings of the present invention will suggest many alternative designs to those skilled in the art.

TABLE 1

EDM burn conditions for lenses used to determine optimum mark configuration.

| | | EDM BURN CONDITIONS | | |
|---|---|---|---|---|
| | E-Pack | E9507 | E9521 | E9520 |
| 1 | EP-SEL | TP | SF | TP |
| 2 | POL | + | − | + |
| 3 | AUX | 0 | 4 | 0 |
| 4 | Ip | 2 | 0 | 1 |
| 5 | DEL Ip | 1 | 0 | 2 |
| 6 | GAP(F) | 10 | 13 | 13 |
| 7 | ON | 1 | 0 | 2 |
| 8 | DEL ON | 0 | 0 | 0 |
| 9 | OFF | 6 | 0 | 3 |
| 10 | DEL OFF | 0 | 0 | 0 |
| 11 | JUMPU | 0 | 3 | 3 |
| 12 | JUMPD | 0 | 2 | 2 |
| 13 | PCON | 0 | 3 | 0 |
| 14 | JUMP | 0 | 0 | 0 |
| 15 | GAIN | 80 | 60 | 60 |
| 16 | OPAJ | 10 | 7 | 10 |

TABLE 1-continued

EDM burn conditions for lenses used to determine optimum mark configuration.

| | EDM BURN CONDITIONS | | |
|---|---|---|---|
| E-Pack | E9507 | E9521 | E9520 |
| LENS | C | A | B |

TABLE 2

Elapsed time and # of pass data for burns performed on Lenses A thru C. Shaded data reported in the mark critical surface characteristics section.

LENS A 0.060" Programmed Height
0.009" Diameter Electrode
*0.015" Diameter Electrode

| E-9521 | ELAPSED TIME | # of PASSES |
|---|---|---|
| #1 | A = 1 min 05 sec    V = 0 min 53 sec | 2 |
| ★#2 | A = 1 min 33 sec    V = 1 min 17 sec | 3 |
| #3 | A = 2 min 01 sec    V = 1 min 40 sec | 4 |
| #4 | A = 2 min 01 sec    V = 1 min 40 sec | 4* |

TABLE 2A.

LENS B 0.060" Programmed Height
*0.009" Diameter Electrode
Cavity 1

| E-9520 | ELAPSED TIME | # of PASSES |
|---|---|---|
| #1 | A = 2 min 03 sec    V = 2 min 03 sec | 5 |
| #2 | A = 3 min 27 sec    V = 2 min 52 sec | 7 |
| #3 | A = 4 min 57 sec    V = 3 min 58 sec | 10 |
| ★#4 | A = 7 min 00 sec    V = 6 min 00 sec | 12 |

TABLE 2B.

LENS C 0.065" Programmed Height
*0.009" Diameter Electrode

| E-9507 | ELAPSED TIME | # of PASSES |
|---|---|---|
| ★#1 | A = 0 min 33 sec    V = 0 min 31 sec | 1 |
| #2 | A = 1 min 05 sec    V = 0 min 58 sec | 2 |
| #3 | A = 1 min 38 sec    V = 1 min 22 sec | 3 |
| #4 | A = 2 min 43 sec    V = 2 min 36 sec | 5 |

TABLE 2C.

What is claimed is:

1. A method of providing visible marks in molded contact lenses, comprising:
   a. placing a recessed mark configuration in a metal mold insert, wherein the recessed mark configuration is at least 10 microns deep, and has a Volume Index, which is the ratio of the quantity volume below a reference surface minus the volume above the reference surface over the volume below the reference surface, of at least 0.9;
   b. injection molding thermoplastic mold frames with the metal mold insert;
   c. molding a soft hydrogel contact lens in the thermoplastic mold frame, wherein the recessed mark configuration in the metal mold insert is transferred as a raised portion to the injection molded thermoplastic mold frame, and is subsequently transferred as a visible recessed mark in a contact lens molded in the thermoplastic mold frame prepared using the insert.

2. A method of providing visible marks in a molded contact lens as claimed in claim 1, wherein the recessed mark configuration has a ratio of surface roughness as measured by Ra, wherein Ra is the arithmetic average deviation from the center line or best fit surface, to PV, the distance between the highest and lowest points in the mark, Ra/PV, of greater than 0.15.

3. A method of providing visible marks in a molded contact lens as claimed in claim 1, wherein the recessed mark configuration has a ratio of surface roughness as measured by RMS, wherein RMS is the root-mean-square deviation from the center line or best fit surface, to PV, the distance between the highest and lowest points in the mark, RMS/PV, of greater than 0.15.

4. A method of providing visible marks in a molded contact lens as claimed in claim 1, wherein the molding step produces a stabilized soft molded hydrogel contact lens.

5. A method of providing visible marks in a molded contact lens as claimed in claim 1, wherein said step of placing a recessed mark configuration is by electric discharge machining.

6. A method of providing visible marks in a molded contact lens as claimed in claim 1, wherein the ratio of the surface roughness in the insert as measured by Ra, wherein Ra is the arithmetic average deviation from the center line or best fit surface, over H, wherein H is the distance between two reference lines in a profile of the mark, Ra/H, is greater than 1.5.

7. A method of providing visible marks in a molded contact lens as claimed in claim 1, wherein the ratio of the surface roughness in the insert as measured by RMS, wherein RMS is the root-mean-square deviation from the center line or best fit surface, over H, wherein H is the distance between two reference lines in a profile of the mark, RMS/H, is greater than 1.5.

8. A method of providing visible marks in a molded contact lens as claimed in claim 4, wherein said step of placing a recessed mark configuration is by electric discharge machining.

9. A method of providing visible marks in a molded contact lens as claimed in claim 8, wherein the recessed mark configuration has a ratio of surface roughness as measured by Ra, wherein Ra is the arithmetic average deviation from the center line or best fit surface, to PV, the distance between the highest and lowest points in the mark, Ra/PV, of greater than 0.15.

10. A method of providing visible marks in a molded contact lens as claimed in claim 9, wherein the recessed mark configuration has a ratio of surface roughness as measured by RMS, wherein RMS is the root-mean-square deviation from the center line or best fit surface, to PV, the distance between the highest and lowest points in the mark, RMS/PV, of greater than 0.15.

11. A method of providing visible marks in a molded contact lens as claimed in claim 10, wherein the ratio of the surface roughness in the insert as measured by Ra, wherein Ra is the arithmetic average deviation from the center line or best fit surface, over H, wherein H is the distance between two reference lines in a profile of the mark, Ra/H, is greater than 1.5.

12. A method of providing visible marks in a molded contact lens as claimed in claim 11, wherein the ratio of the surface roughness in the insert as measured by RMS, wherein RMS is the root-mean-square deviation from the center line or best fit surface, over H, wherein H is the distance between two reference lines in a profile of the mark, RMS/H, is greater than 1.5.

* * * * *